(12) United States Patent
Kozu et al.

(10) Patent No.: US 7,248,021 B2
(45) Date of Patent: Jul. 24, 2007

(54) BATTERY PACK WITH RESIN INTEGRATED SUBSTRATE AND VENT

(75) Inventors: Katsumi Kozu, Sanda (JP); Takeshi Ishimaru, Moriguchi (JP); Satoshi Kataoka, Takaoka-gun (JP); Koichi Toriyama, Moriguchi (JP); Iichiro Mori, Itami (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 381 days.

(21) Appl. No.: 10/507,458

(22) PCT Filed: Feb. 17, 2003

(86) PCT No.: PCT/JP03/01675

§ 371 (c)(1),
(2), (4) Date: Sep. 10, 2004

(87) PCT Pub. No.: WO03/081695

PCT Pub. Date: Oct. 2, 2003

(65) Prior Publication Data

US 2005/0151514 A1 Jul. 14, 2005

(30) Foreign Application Priority Data

Mar. 22, 2002 (JP) .............................. 2002-081239
Oct. 15, 2002 (JP) .............................. 2002-300516

(51) Int. Cl.
*H01M 10/46* (2006.01)
(52) U.S. Cl. .................................................... 320/147
(58) Field of Classification Search ................. 320/107, 320/112, 147, 150, 153
See application file for complete search history.

(56) References Cited

U.S. PATENT DOCUMENTS

| 3,948,441 | A | 4/1976 | Perkins et al. |
|---|---|---|---|
| 6,210,824 | B1 * | 4/2001 | Sullivan et al. ............... 429/53 |
| 6,432,575 | B1 | 8/2002 | Yamagami |
| 6,824,917 | B2 | 11/2004 | Aaltonen et al. |
| 6,994,926 | B2 | 2/2006 | Ikeuchi et al. |
| 2003/0082441 | A1 | 5/2003 | Hovi et al. |
| 2005/0106454 | A1 | 5/2005 | Kozu et al. |
| 2005/0112456 | A1 | 5/2005 | Kozu et al. |
| 2005/0151514 | A1 | 7/2005 | Kozu et al. |

FOREIGN PATENT DOCUMENTS

| JP | 64-072458 | 3/1989 |
|---|---|---|
| JP | 05-159758 | 6/1993 |
| JP | 07-057721 | 3/1995 |
| JP | 8-162078 | 6/1996 |
| JP | 2000-315483 | 11/2000 |

(Continued)

*Primary Examiner*—Edward H. Tso
(74) *Attorney, Agent, or Firm*—Jordan and Hamburg LLP

(57) ABSTRACT

Constructing a battery pack by: providing a resin sheet (40) to cover a release opening (20a) of a safety vent (20) formed on a sealing plate (23); integrating a rechargeable battery (2) and a circuit substrate (3) with a primary molding (11) by filing a resin between the rechargeable battery (2) and the circuit substrate (3); and then forming a secondary molding (12). In such constructed battery pack, an ejected gas, at the operation of the safety vent (20) of the battery pack, is externally released through an interface between the resin and metal.

11 Claims, 13 Drawing Sheets

FOREIGN PATENT DOCUMENTS

| | | |
|---|---|---|
| JP | 2002-110121 | 4/2002 |
| JP | 2002-134077 | 5/2002 |
| JP | 2002-166447 | 6/2002 |
| JP | 2002-260609 | 9/2002 |
| JP | 2002-373630 | 12/2002 |
| JP | 2003-017022 | 1/2003 |
| JP | 2003-022789 | 1/2003 |
| JP | 2003-086159 | 3/2003 |

* cited by examiner

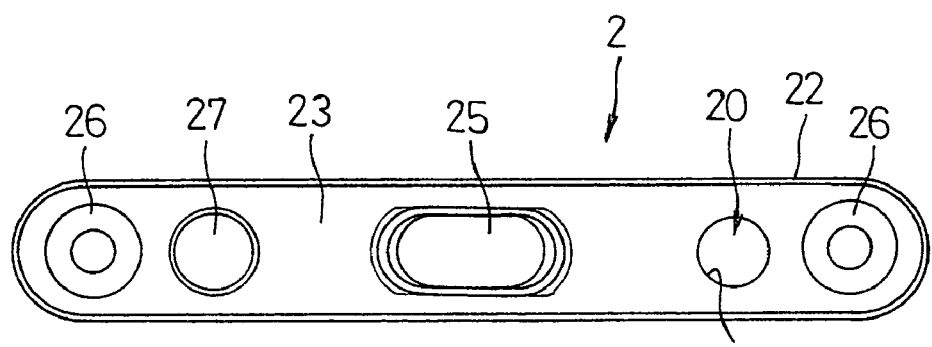
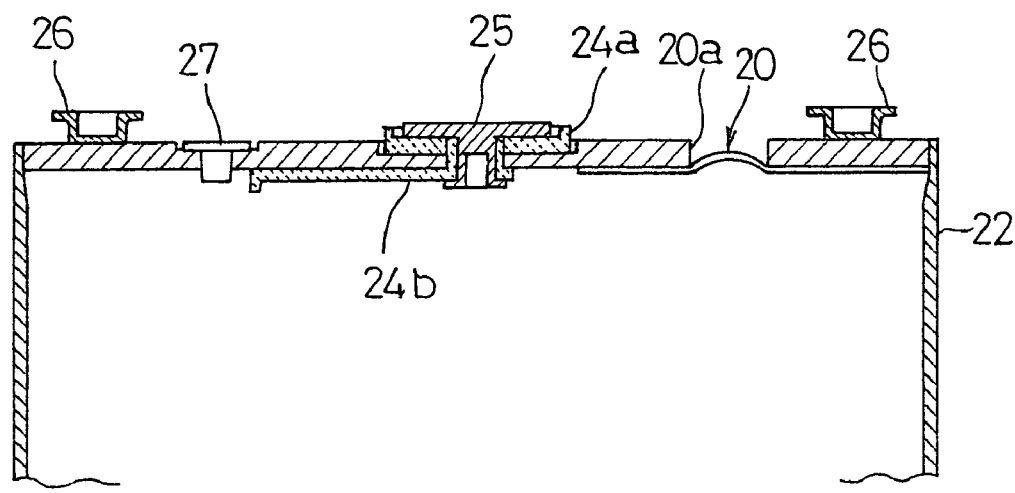

BATTERY PACK WITH RESIN INTEGRATED SUBSTRATE AND VENT

TECHNICAL FIELD

The present invention relates to a battery pack in which a rechargeable battery is integrally fixed, by resin, with a circuit substrate formed with a battery protection circuit, external terminals and the like, and terminal plates. It relates more particularly to a battery pack provided with a safety vent structure for preventing explosion of the rechargeable battery by externally releasing abnormally increased internal pressure of the battery caused by abnormal use or the like.

BACKGROUND ART

With the remarkable development of small, thin, and high-functionality portable electronic equipment such as mobile phones and PDAs, there is a growing demand for smaller, thinner, and high-capacity batteries as their power source. Lithium ion rechargeable batteries can be designed small and high-capacity, and in particular, flat prismatic types are suitable in making the equipment thinner; they have therefore been increasingly used as the repeatedly usable rechargeable battery for portable electronic equipment.

Because lithium ion rechargeable batteries have high energy density and contain a flammable organic solvent as electrolyte, it is essential to take account of safety measures. They must have such safety features as to ensure that no damage is caused to the equipment or injury to the user in the event that an abnormality arises for some reason. For example, if the positive and negative terminals of the battery are short-circuited for some reason, a large short-circuit current flows in high energy density batteries, whereupon the inner resistance generates Joule heat and the battery temperature rises. A temperature rise in the battery leads to a rapid increasing of gas pressure inside resulting from reactions between positive electrode active materials and electrolyte, or from evaporation or decomposition of electrolyte, which may cause fire or explosion of the battery. Batteries may fall into a high-temperature state not only because of external short-circuiting but also of overcharge; the same applies if the portable electronic equipment loaded with the battery is placed near a heater or left inside a car parked in a hot weather environment.

A battery abnormality can be induced by any of electrical, mechanical, or thermal factors; thus non-aqueous electrolyte batteries represented by lithium ion rechargeable batteries are provided with safety features for preventing batteries from falling into an abnormal state and for evading a further dangerous state even if an abnormality should arise. Such features are usually incorporated in batteries as their own natures; for example, active materials on the electrodes and electrolyte may be made not to be excessively reactive, or, a polyolefin porous film may be employed for the separator because of its "shutdown function," in which minute pores are softened and close under an abnormally high temperature. Further, it is necessary to prevent the battery from exploding when the battery is exposed to a high temperature condition. Thus, the battery is provided with a safety vent for externally releasing abnormally increased internal pressure thereof. As preventive means for protecting batteries from damaging by the aforementioned short-circuit, relatively large-sized lithium ion rechargeable batteries are usually provided with a protective feature such as a Positive Temperature Coefficient (PTC) element connected in series to the input/output circuit at the sealing end, which limits current flow in the event of external short-circuiting. Small batteries that cannot include the PTC element inside are normally provided with a PTC element or temperature fuse as outside circuit components which are then integrally formed with the batteries. Further, a circuit for protecting the battery from overcharge and over discharge is an absolute requirement. In general, these constituent elements are all packed with the battery inside a pack case to form a battery pack.

However, battery packs using pack cases are not suited to portable electronic equipment that are re-modeled in short cycles, because the manufacturing cost of molding dies used in the resin molding of pack cases tends to be high, and the time required for designing new molding dies is relatively long. Thinner battery packs with resin-molded pack case as an outer case also have limitations in making portable electronic equipment smaller and thinner because of the limitations on the moldable thickness in the resin molding process.

Furthermore, in order to prevent the user from disassembling a battery pack for wrong use or for satisfying curiosity, it must have a design that is hardly disassemblable, or a design that alerts the user that it has been disassembled. Taking account that the battery packs are used for portable electronic equipment, they also need to have a rigid structure that can withstand vibration or shocks in a falling accident, and a moisture resistance, particularly for the electronic circuit parts. In achieving the structure having a disassemblablity, a certain rigidity, and a moisture resistant, the idea has emerged that a battery may be united with a circuit substrate including a battery protective circuit by resin molding.

The conventionally known resin-molded battery packs are disclosed in Japanese Laid-Open patent Publications Nos. 2002-134077 and 2002-166447, in which a battery and a circuit substrate are connected by a connecting member to form an intermediate product, which is placed inside a die, and resin is filled around the intermediate product such as to expose external terminals formed on the substrate to the outside, to unite the battery with the substrate.

Further, Japanese Laid-Open patent Publication No. 2000-315483 discloses a structure in which a battery and a circuit substrate are connected by a connecting member and placed inside a die, and the circuit substrate is resin-sealed and fixed on the battery or its pack case (battery lid), or both the circuit substrate and the battery are resin-sealed.

When constructing a battery pack by a resin molding in realizing the size reduction and the thickness reduction, an optimum construction is such that constituent elements including a circuit substrate are placed at the side of a sealing end of a rechargeable battery, and a resin is filled and molded between the sealing end of the rechargeable battery and the circuit substrate. However, there has been a problem that an externally releasing opening of a safety vent is filled with the molded resin, thereby the safety vent loses its function.

Furthermore, the battery pack is brought to be placed inside equipment where constituent elements are densely arranged, particularly in the case of equipment having a reduced size and thickness. In such configuration, the equipment may be damaged by electrolyte released together with gas when the safety vent operates. A desirable construction is such that when the safety vent operates, only gas component is externally released, and liquid component such as the electrolyte is not externally released. However, the safety vent opens its release opening at a burst when it is reached to a critical operating pressure. Accordingly, it is difficult to prevent the liquid component from released together with the gas component. In the battery pack where a conventional pack case having constituent elements including a rechargeable battery therein, it is possible to provide means for holding a released electrolyte to stay within the pack case. However, a battery pack using a resin mold has no case-like member, and so requires a construction for preventing a liquid component from being externally ejected.

It is an object of the present invention to provide a battery pack which is constructed by resin molding without compromising the explosion-proof features of the safety vent.

DISCLOSURE OF THE INVENTION

To achieve the above object, a battery pack according to a first aspect of the present invention comprises a rechargeable battery including a safety vent by forming a release opening, for externally releasing internal abnormal pressure of a battery case, on a metal sealing plate sealing an open end of the battery case accommodating elements for electromotive force, and a substrate, having external terminals thereon, being provided above the sealing plate. The rechargeable battery and the substrate are integrated by a resin molding being filled and molded between the sealing plate and the substrate, and the resin molding is molded with filled resin and forms an operating space for the safety vent therein.

According to the above-described structure, resin is filled and molded to form the operating space for the safety vent therein during integrating the rechargeable battery and the substrate placed on the rechargeable battery by the resin molding, the resin molding will not damage a function of the safety vent. Accordingly, by forming the battery pack comprising a rigid, small and thin structure by resin forming, the function of the safety vent is always performed properly.

It is preferable that the safety vent in the above configuration is a clad vent structure which is formed by closing the release opening with a foil-like material at its side facing the inner side of the battery case. Since the resin molding is formed with the operating space therein, the operation of the safety vent will not be damaged by the filled resin.

Further, by forming an opening portion connecting through to the operating space on the substrate, the ejected gas, when the safety vent operates, will be externally released through the opening portion of the substrate.

Further, by providing a porous material inside the operating space, the electrolyte contained in the ejected gas is trapped in the porous material where the gas component is externally released. Accordingly, the electrolyte is suppressed from being externally leaked while the operation of the safety vent.

Further, by covering the release opening of the safety vent of the sealing plate by a sheet-like member prior to the resin filling, the resin does not intrude into the safety vent, the resin is filled and molded to form the operating space therein, and the ejected gas, when the safety vent operates, is externally released through interface between the sheet-like member and the sealing plate interface between the sheet-like member and the resin. Since side surfaces of the sheet-like member are exposed to outside, the releasing of the gas through the interface is more properly performed. Further, by making the sheet-like member with a porous material, the electrolyte contained in the ejected gas is trapped in the porous material where the gas component is externally released. Accordingly, the electrolyte is suppressed from being externally leaked while the operation of the safety vent.

Further, by covering an externally open part of the operating space or the externally exposed part of the sheet-like member with a covering sheet, the externally releasing portion does not appear on the exterior. At the operation of the safety vent, affixation of the outer covering sheet is broken by ejection pressure, thereby the gas is externally released.

Further, by comprising, at the release opening of the safety vent of the seal plate, a rubber-made sealing plug having a stem portion and a lid portion molded to extend a projected area of the release opening where the stem portion is press-fit into the release opening, the resin will not intrude into the safety vent, and the resin is filled and molded while reserving the operating space for the safety vent, and the ejected gas at the operation of the safety vent is externally released through interface between the sealing plug and each of the seal plate and the resin. In addition, because of the press-fit, the sealing plug is more securely held at a desired position until the resin is filled and molded.

Furthermore, by forming a gap extending along the stem portion from its tip end to a stem base at the lid portion at the rubber-made sealing plug, and positioning the gap between the releasing opening and the sealing plug, the ejected gas will be easily released, when the safety vent operates, through the gap, interface between the lid portion of the sealing plug and the sealing plate, and the interface between the resin and the sealing plug.

BRIEF DESCRIPTION OF THE DRAWINGS

FIGS. 2A and 2B show a construction of a rechargeable battery according to the embodiment, FIG. 2A being a plan view and FIG. 2B being a cross-sectional view;

BEST MODE FOR CARRYING OUT THE INVENTION

Preferred embodiments of the present invention will be hereinafter described with reference to the accompanying drawings for an understanding of the invention. It should be understood that the following embodiments of the invention are merely given as examples and should not limit the technical scope of the invention.

The present embodiment shows one example of a battery pack employing a flat prismatic lithium ion rechargeable battery that is united with a circuit substrate including external terminals and a battery protective circuit by resin molding and applied to a mobile phone. Battery packs for mobile phones need to be small, light-weight, and thin, and in addition, they are desired to have a high energy density in accordance with high functionality, a high mechanical strength to withstand impacts caused by a falling accident which is inevitable with portable equipment, a structure that does not allow easy disassembling, and safety features for protecting the rechargeable battery from short circuits, overcharge, and high temperature. The battery pack described below satisfies all these requirements.

Figure 1:
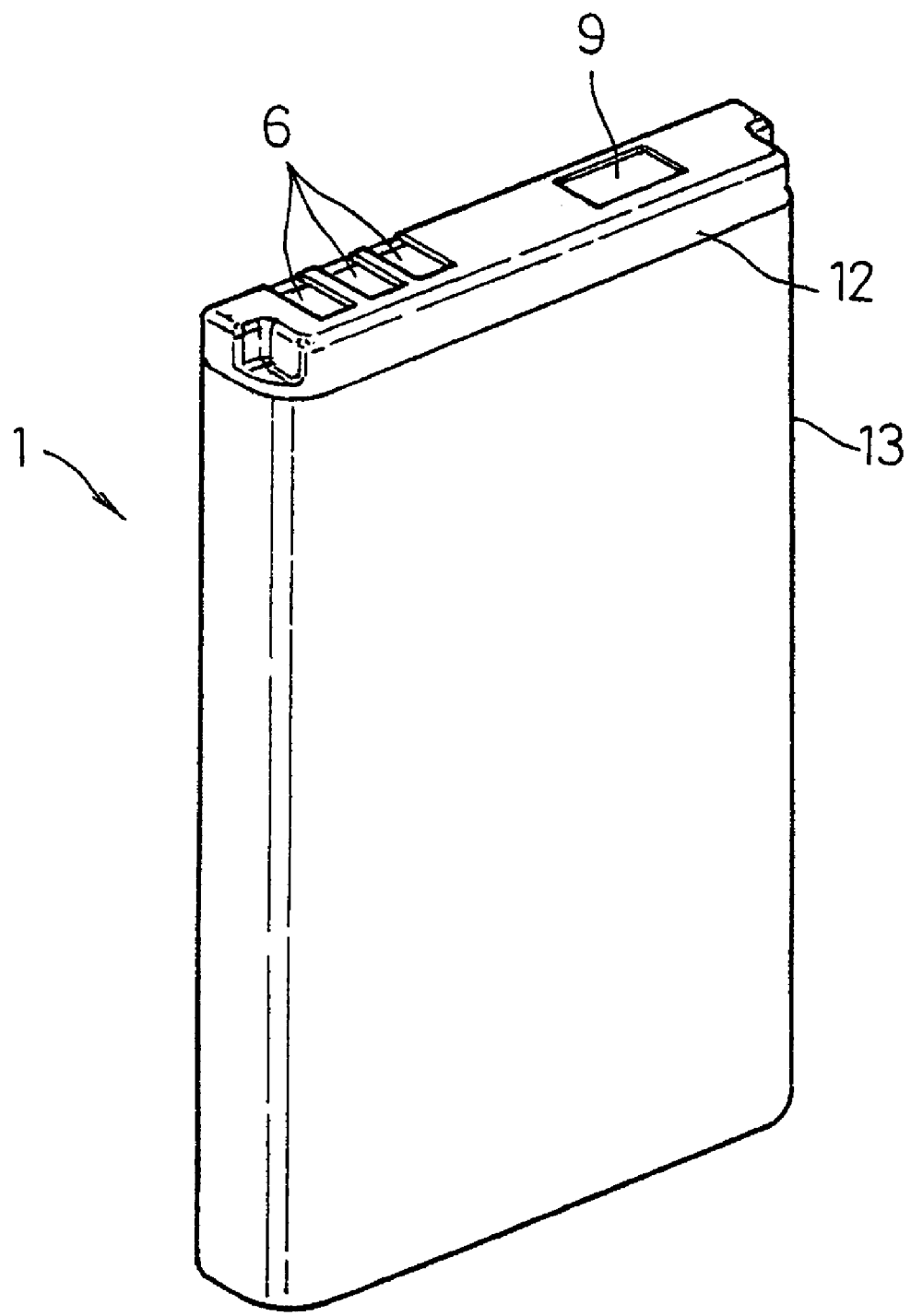
FIG. 1 is a perspective view, showing an external appearance of a battery pack according to an embodiment of the present invention.

FIG. 1 illustrates an external appearance of the battery pack 1 according to this embodiment. On one end face of the flat and asymmetrically shaped battery pack are exposing external terminals 6 consisting of a positive terminal, a negative terminal, and a temperature detecting terminal, and bonded a water ingress label 9 on a test terminal 30 which will be described later. The details of this battery pack 1 will be described hereinafter.

FIGS. 2A and 2B show a construction of a rechargeable battery 2 applied to the battery pack 1, wherein the battery is assumed to be a lithium ion rechargeable battery. The rechargeable battery 2 accommodates elements for electromotive force in a bottomed tube-like aluminum battery case 22 which has an oval cross-section, and the open end of the case is sealed with a sealing plate 23 by laser welding. The seal plate 23 is joined to the battery case 22 and serves as a positive electrode; a rivet 25 that serves as a negative electrode is mounted at the center of the sealing plate 23 and electrically insulated from the sealing plate 23 by an upper gasket 24a and a lower gasket 24b. Apart of the sealing plate 23 is formed to be a clad plate by cladding with foil-like plates. A release opening 20a is provided at the portion where the clad plate is formed, thereby forming a safety vent 20. The safety vent 20 externally releases abnormal internal pressure by breaking the foil-like plate portion when a gas is generated in the battery case 22 due to some cause such as temperature rise and internal pressure increase, thereby explosion of the battery case 22 is prevented. Further, to both ends of the sealing plate 23, eyelet-shaped engaging members 26 are welded in order to engage a later-described primary molding 11 to the rechargeable battery 2. Reference numeral 27 designates a sealing plug, which is for sealing an electrolyte inlet formed at the sealing plate 23, and which is press-fit into the electrolyte inlet and welded to the sealing plate 23 after the electrolyte is injected into the battery case 22.

Figure 3A:
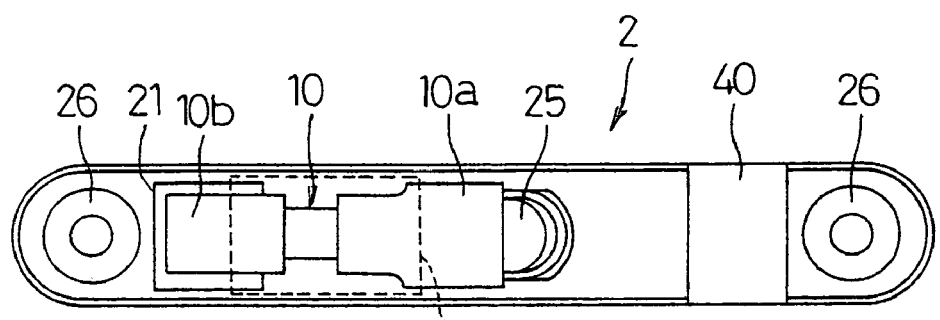
FIGS. 3A and 3B show a status of an arrangement of members on a seal end, FIG. 3A being a plan view and FIG. 3B being a cross-sectional view.
Figure 3B:
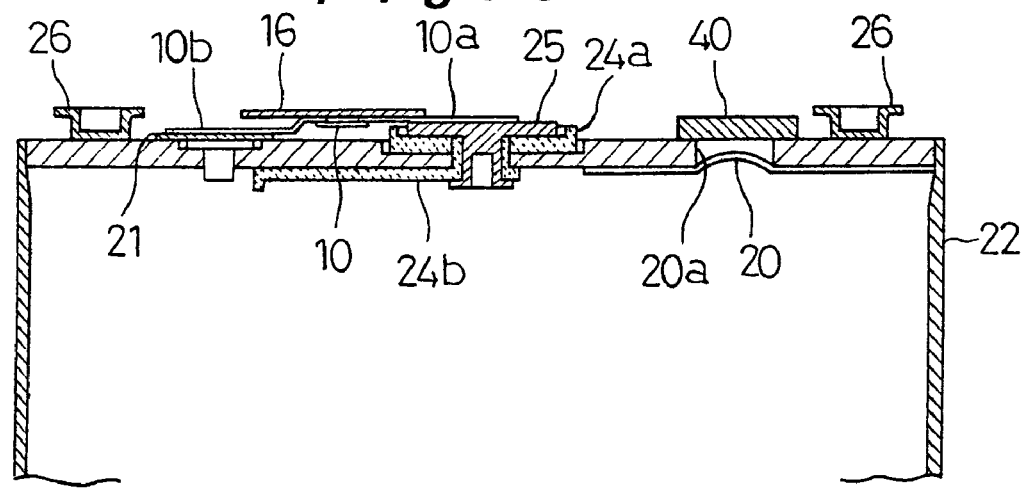

In the rechargeable battery 2, one connecting piece 10a of a thermal fuse 10 is welded to the rivet 25 as shown in FIGS. 3A and 3B. On an upper surface of the temperature fuse 10, a thermal insulation sheet 16 is affixed for preventing fusion of the temperature fuse 10 during the resin filing process to be described later. A connecting piece 10b at the other end of the temperature fuse 10 is placed on an insulating paper 21 affixed on the sealing plate 23 and bonded to one end of a negative lead plate 5 to be described later. Heat conductive adhesive is applied between the temperature fuse 10 and the rechargeable battery 2, thereby facilitating transfer of heat of the rechargeable battery 2 to the temperature fuse 10.

Figure 4A:
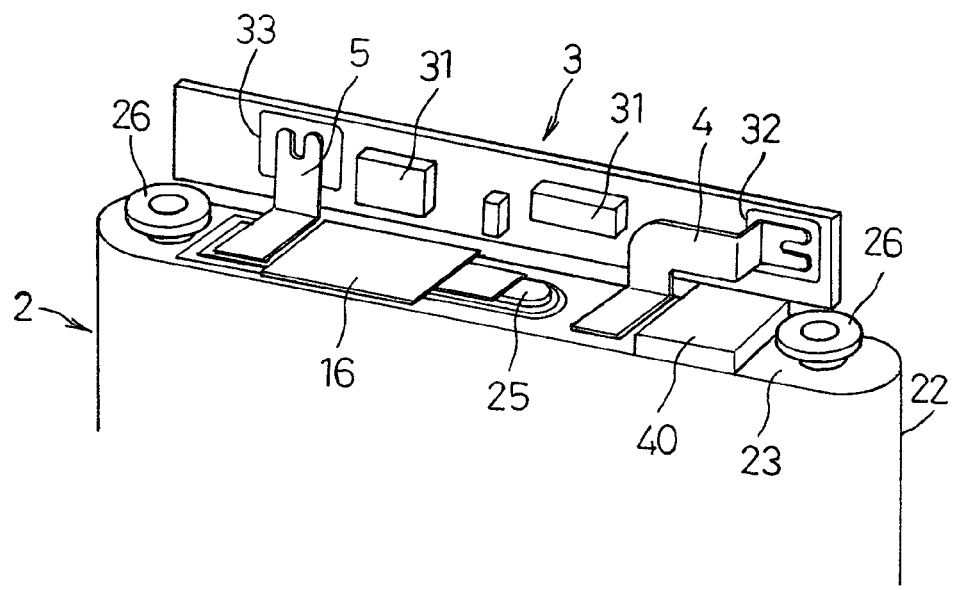
FIGS. 4A and 4B are perspective views, showing status of mounting a circuit substrate on the rechargeable battery.
Figure 4B:
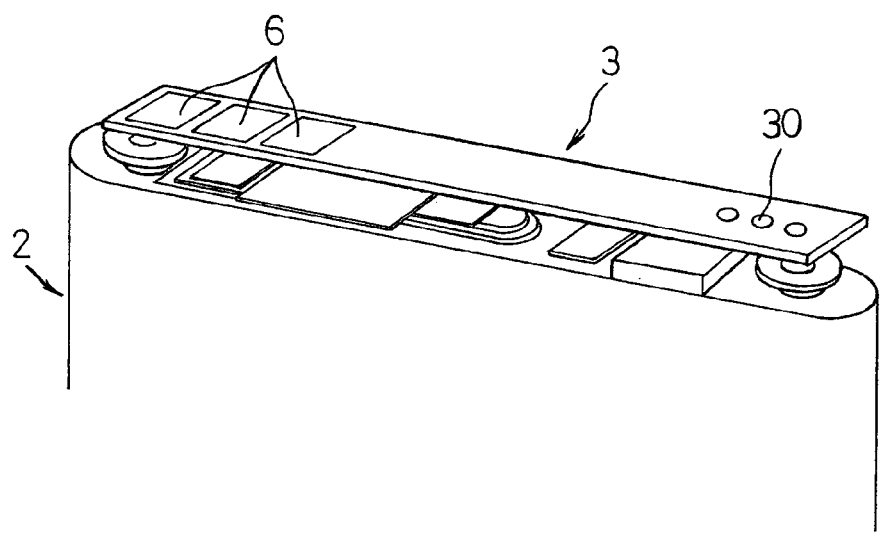
Figure 9A:
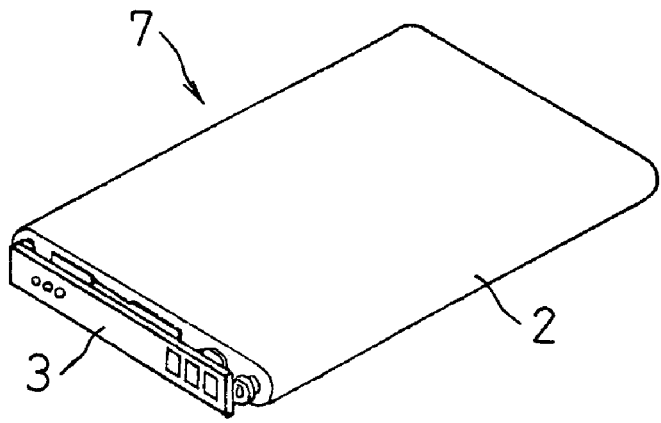
FIGS. 9A to 9C are perspective views, showing a formation process of production steps in chronological order.

Furthermore, a resin sheet 40 is affixed at the release opening 20a of the safety vent 20 formed at the sealing plate 23 in order to cover the release opening 20a for preventing a filled resin from intruding into the release opening 20a. To this rechargeable battery 2 with the temperature fuse 10 and the resin sheet 40 attached thereto is mounted a circuit substrate 3 using a positive lead plate 4 and a negative lead plate 5, as shown in FIG. 4A. The circuit substrate 3 includes a circuit for protecting the rechargeable battery 2 from overcharge, over discharge, and over current; on one side are formed the aforementioned external terminals 6 and the test terminal 30, and on the other side are mounted electronic components 31 such as ICs and positive and negative solder lands 32, 33 at both ends for the connection with the rechargeable battery 2; one end of the positive lead plate 4 is soldered to the positive solder land 32, and one end of the negative lead plate 5 is soldered to the negative solder land 33. The other end of the positive lead plate 4 is spot-welded on the face of the sealing plate 23, and the other end of the negative lead plate 5 is spot-welded on the connection piece 10b of the temperature fuse 10. The circuit substrate 3 is orthogonal to the face of the sealing plate 23 in this state; the positive and negative lead plates 4, 5 are then bent over so that the circuit substrate 3 is substantially parallel to the sealing plate 23 with a gap therebetween, as shown in FIG. 4B. The circuit substrate 3 is thus connected to the rechargeable battery 2 to form an object 7 to be resin packed shown in FIG. 9A.

Figure 5:
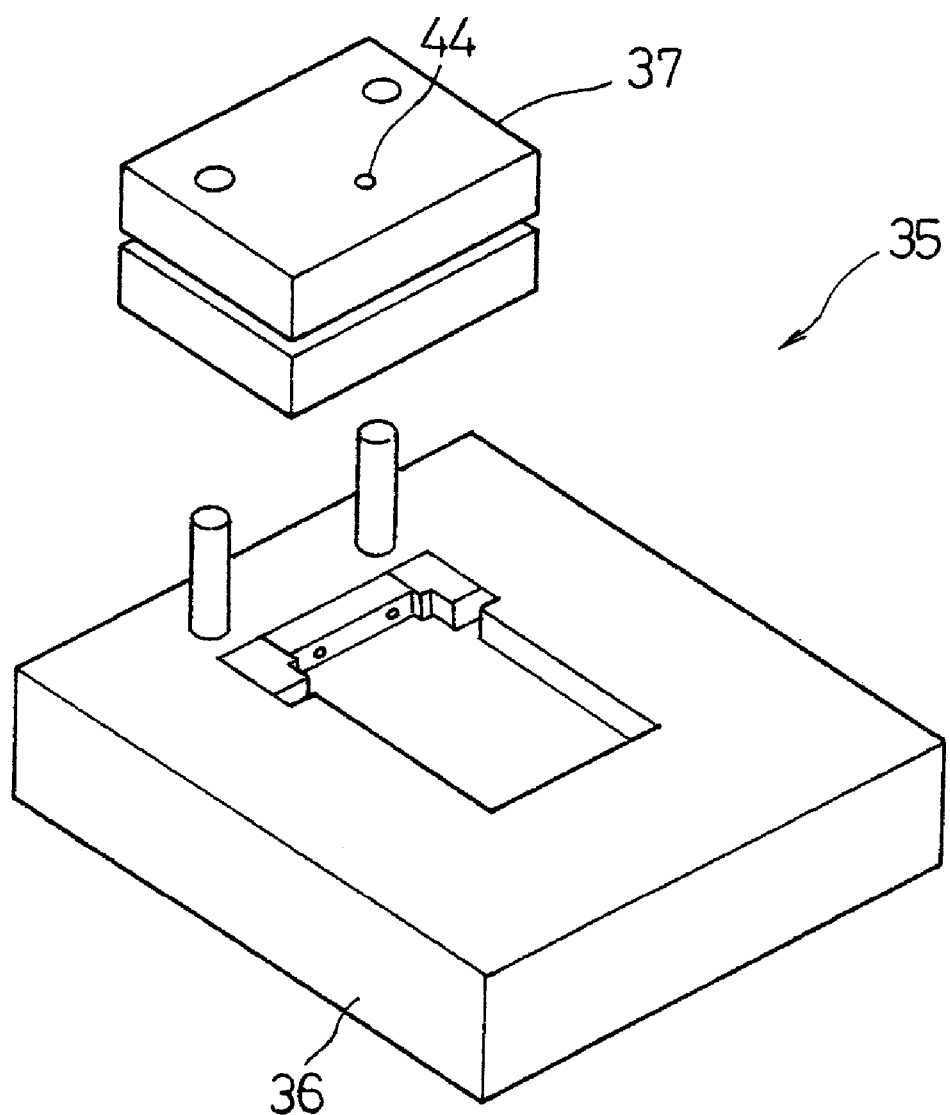
FIG. 5 is a perspective view, showing the structure of a primary molding die.
Figure 6:
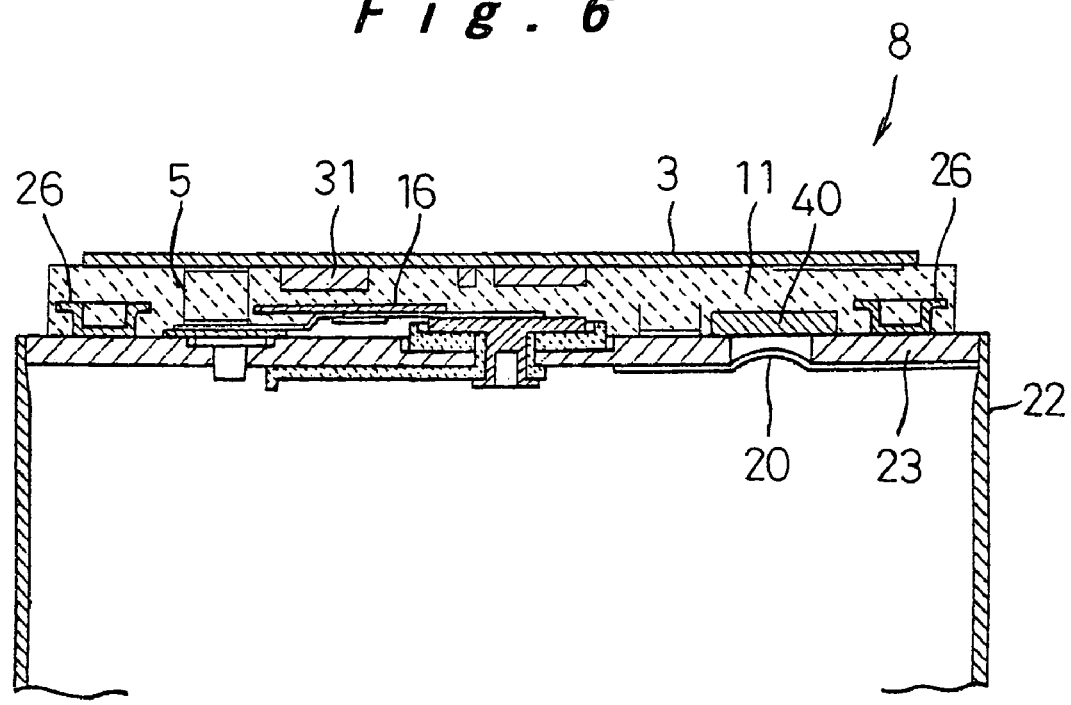
FIG. 6 is a cross-sectional view, showing a resin mold formed by the primary molding.

Resin is filled in the gap between the rechargeable battery 2 and the circuit substrate 3 of the object 7 to be resin packed to integrate them together, thereby a primary resin molding 11 is formed. The primary resin molding 11 is processed with the steps: placing the object 7 to be resin inside a primary molding die 35 shown in FIG. 5, and injecting the resin into the gap between the rechargeable battery 2 and the circuit substrate 3, as shown in FIG. 6. The injected resin surrounds the electronic components 31 and positive and negative lead plates 4, 5 mounted on the circuit substrate 3 and bonds to the substrate 3, as well as surrounds the undercut portions of the engaging members 26 formed on the sealing plate 23 of the rechargeable battery 2 and bonds to the sealing plate 23. According to this resin injecting process, the electronic components 31 mounted on the circuit substrate 3 is covered by the resin, thereby insulation characteristics and moisture resistant characteristics are increased. The injected resin also enters into and wraps around the undercut portions of the engaging members 26. The undercut portions provide an anchoring effect to retain the primary molding 11 onto the rechargeable battery 2 and firmly couples the rechargeable battery 2 and the circuit substrate 3, thus ensuring the bond between them. Besides, portions of the primary molding die 35, which are to contact with active parts such as the external terminals 6, are provided with an insulation treatment such as alumite coating in order to prevent short-circuit of the object 7 to be resin packed.

Here, a hot melt resin having a relatively low melting temperature is used as the resin to be filled. The melting temperature of the resin exceeds a thermal cutoff temperature of the temperature fuse 10, so that the filled resin may cut the temperature fuse 10 when it directly contacts the temperature fuse 10. However, since the heat insulation sheet 16 is provided, the temperature fuse 10 is prevented from being cut by the filled resin. Furthermore, since the resin sheet 40 is affixed on the safety vent 20, the filled resin does not intrude into the release opening 20*a* to close the operating space of the safety vent 20, thereby preventing the function of the safety vent 20 from being compromised.

Figure 9B:
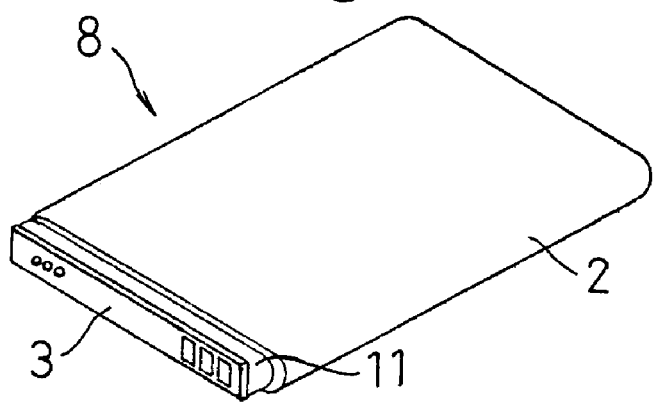

By taking out the primary molding 11 from the primary molding die after the primary molding 11 is formed by curing the filled resin, the intermediate product 8 shown in FIGS. 6 and 9B is taken out from the lower die 36.

This intermediate product 8 is made into a battery pack 1 by providing with an outer covering. The outer covering is formed by a secondary molding process and a winding sheet affixing process. An insulator 14 is attached to the bottom face of the rechargeable battery 2 before the secondary molding.

Figure 7:
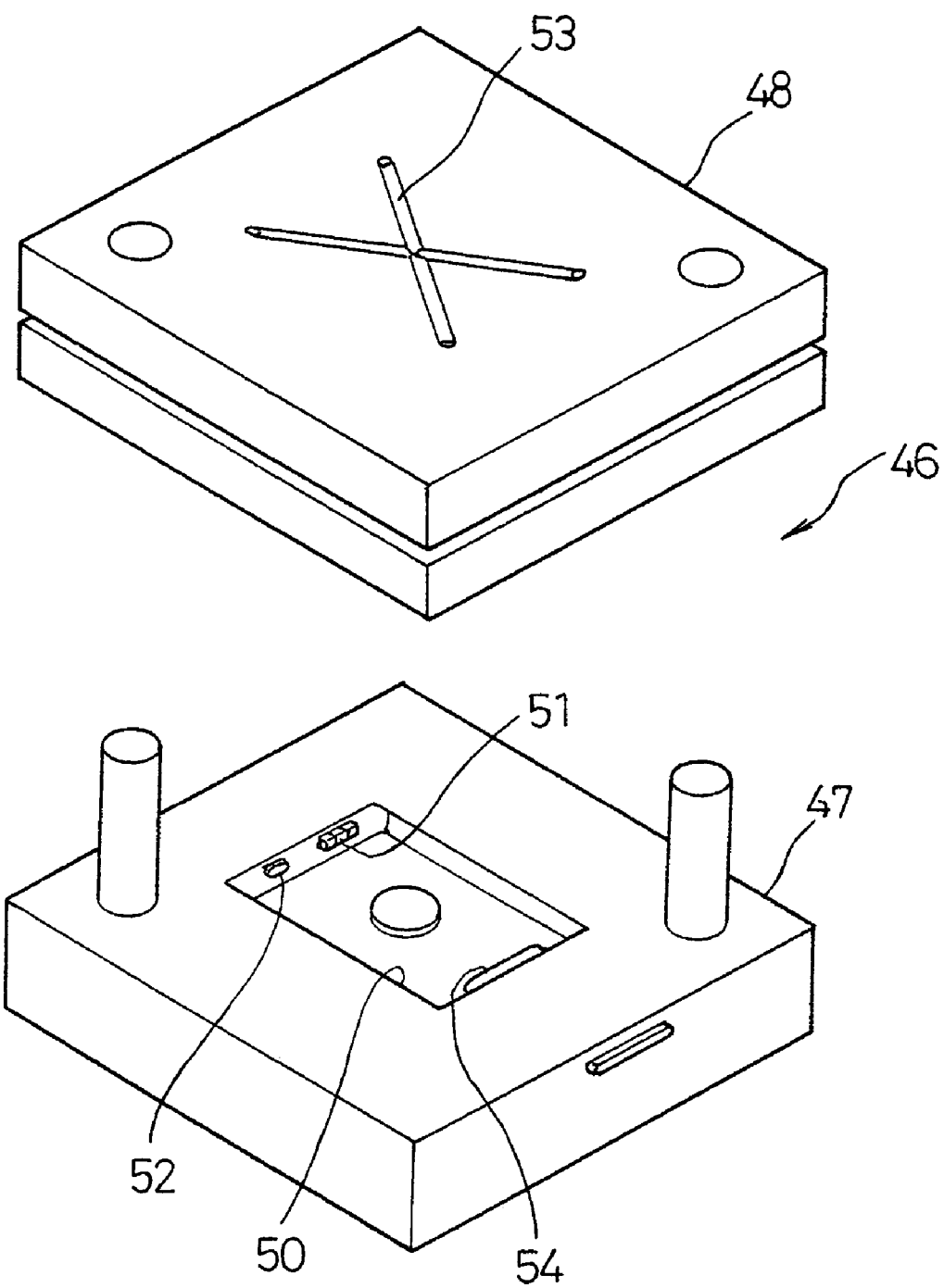
FIG. 7 is a perspective view, showing the structure of a secondary molding die.

In the secondary molding, the intermediate product 8 is placed in a secondary molding die 46 as shown in the FIG. 7, so that predetermined parts of the intermediate product 8 are packed with resin. A lower die 47 of the secondary molding die 46 has a cavity 50 for accommodating the intermediate product 8; in a wall on one side of the cavity 50 are provided inwardly biased projections 51, 52 for the three external terminals and the test terminal, and in the opposite wall is provided an inwardly biased projection 54 for the bottom face of the battery. When the intermediate product 8 is placed in the cavity 50 and these projections 51, 52, 54 are moved forward, they make pressure contact with the external terminals 6 at three locations on the circuit substrate 3, the test terminal 30, and the insulator 14 bonded on the bottom face of the rechargeable battery 2, respectively. It is to be noted that the secondary molding die 46 is also provided with an insulation treatment such as alumite coating to the protrusions 51 for the external terminal and the protrusion 52 for the test terminal thereof. Thereby, the intermediate product 8 is prevented from generating short-circuit and electrical leakage.

Figure 8:
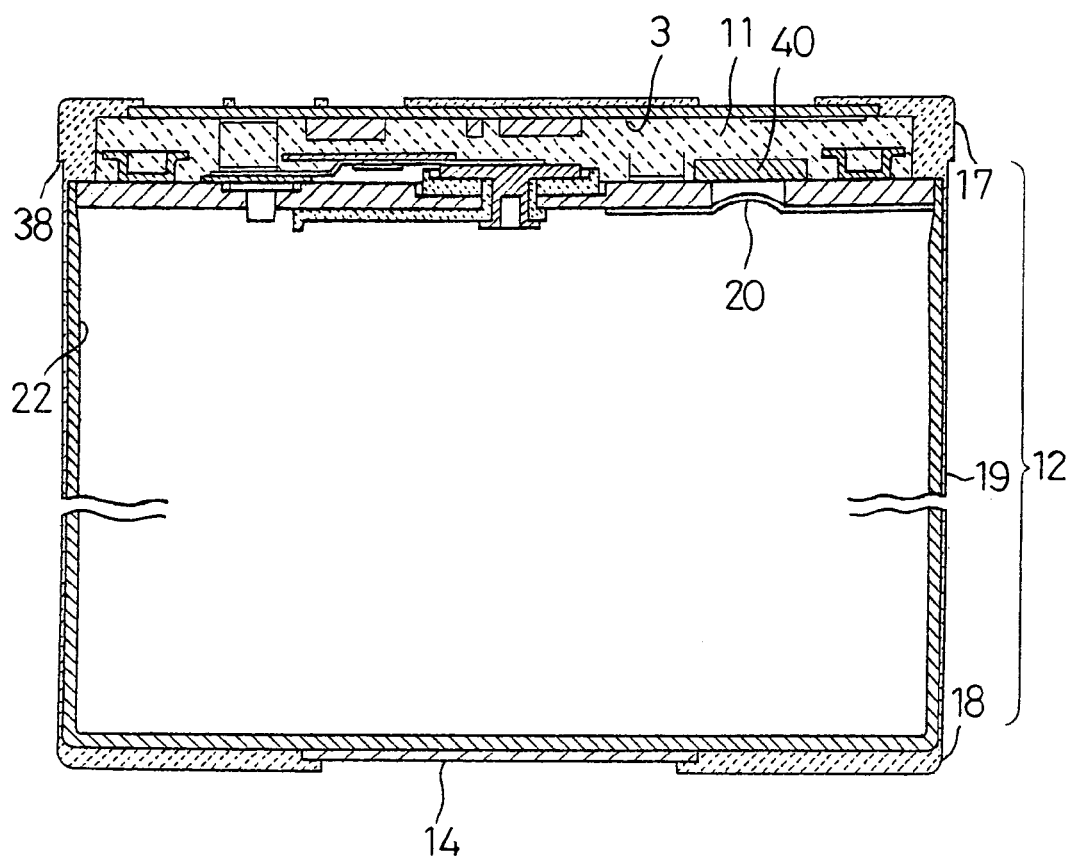
FIG. 8 is a cross-sectional view, showing a resin mold formed by the secondary molding.
Figure 10:
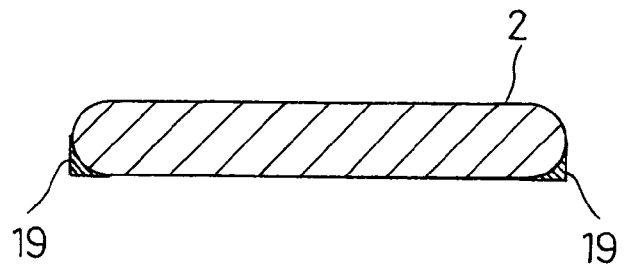
FIG. 10 is a cross-sectional view, showing a status of molding a connecting part to the rechargeable battery.

The lower die 47 in this state is then closed by an upper die 48, and resin is filled from a gate 53 in the upper die 48 into the secondary molding die 46. The resin is injected into the secondary molding die 46 from four locations for forming the following: An upper mold 17 fixed on the sealing plate 23 of the rechargeable battery 2 and covering the primary mold 11 and the circuit substrate 3 while exposing the external terminals 6 and the test terminal 30 of the intermediate product 8 to the outside and exposing the central portion of the insulator 14 to the outside as shown in FIG. 8; a lower mold 18 fixed on the bottom face of the rechargeable battery 2 to a predetermined thickness such as to surround the Insulator 14; and a connecting part 19 for coupling the upper mold 17 and the lower mold 18 along two corners on one side of the rechargeable battery 2, thereby a secondary mold 12 is formed. The connecting part 19 is formed such that the two parts of the arc on one side of the oval cross section of the rechargeable battery 2 at 90 degrees are right-angled, as shown in FIG. 10.

Figure 9C:
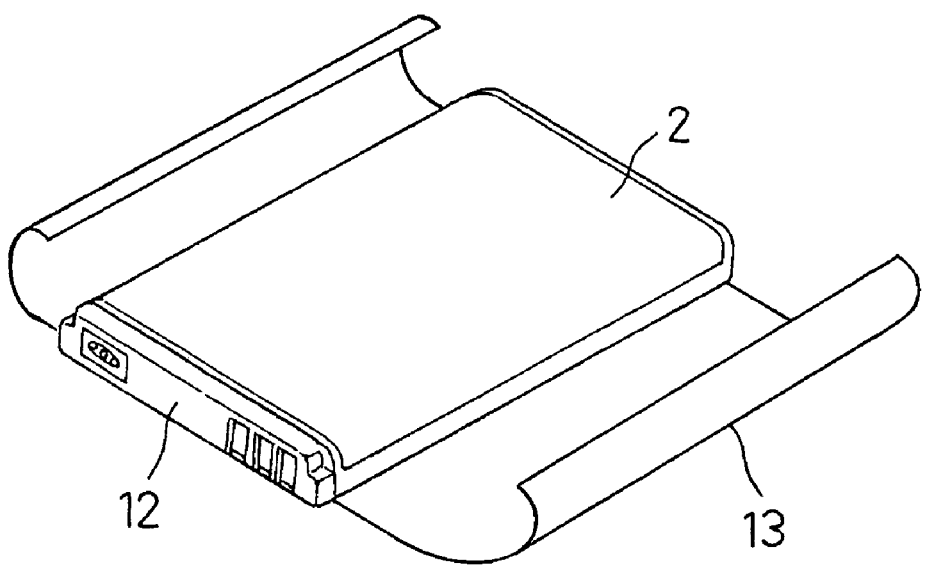

The upper mold 17 has a step 38 in its periphery near the battery 2, which defines a line along which a winding sheet 13 is wound around the periphery of the rechargeable battery 2 as shown in FIG. 9C. The battery operation is then inspected using the test terminal 30, and the water ingress label 9 is bonded in the cavity surrounding the test terminal 30 of the batteries that have passed the inspection, whereby the battery pack 1 shown in FIG. 1 is obtained.

The battery pack 1 thus formed has curved shoulders on one flat side corresponding to the arc on both sides of the rechargeable battery 2, while the other two corners on the opposite side are right-angled because of the connecting part 19; this feature, coupled with the asymmetric arrangement of the external terminals 6, prevents the battery to be reversely loaded in equipment. The curved corners will snugly fit in rounded corners in the battery accommodation case of the equipment without leaving any dead space.

Figure 11:
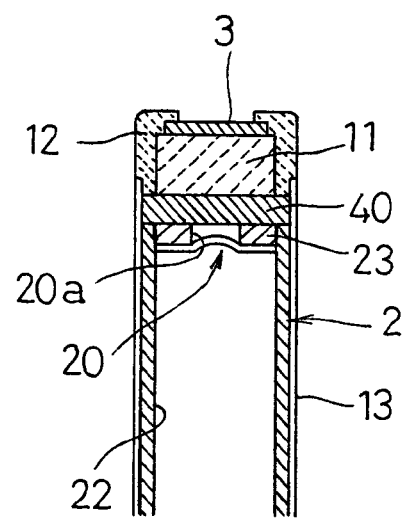
FIG. 11 is a vertical cross-sectional view at a position of a safety vent.

In the case when a portable cellular phone installed with the battery pack 1 being manufactured as above is exposed to a high temperature environment, such as being placed nearby a heater or the like, the internal pressure of the rechargeable battery 2 rapidly increases due to evaporation or decomposition of the electrolyte. When the internal pressure increases up to an operating pressure of the safety vent 20, the foil-like portion of the safety vent 20 is broken, and then the internal pressure is released through the release opening 20*a*. Since the resin sheet 40 affixed to cover the upper side of the release opening 20*a* is placed to fully cover the thickness of the rechargeable battery 2, as shown in FIGS. 3A, 3B and 11, its side faces are externally exposed even after the primary molding 11 and the secondary molding 12 are formed, and are covered with the winding sheet 13. When the safety vent 20 operates and the gas containing the electrolyte is ejected through the release opening 20*a*, a gas component flows out of the adhesion interface between the resin sheet 40 and the sealing plate 23, and is externally released by breaking the adhesion surface of the winding sheet 13. However, liquid component such as the electrolyte will not pass through the interface, and is held to stay inside. In the case where the resin sheet 40 is made by a porous material, the gas component passes through the inside of the porous material, and breaks the adhesion of the wrap-around sheet 13 to be externally released, while much of the liquid component is absorbed in the porous material, and is suppressed from being externally leaked.

Figure 12:
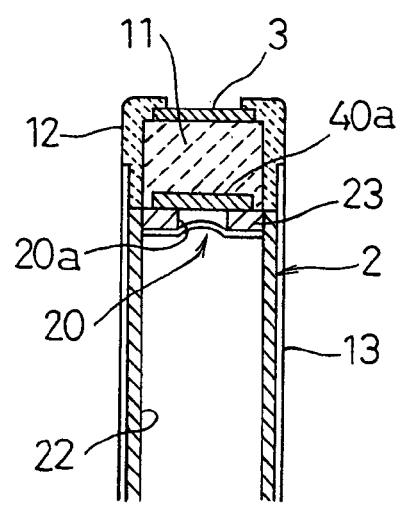
FIG. 12 is a cross sectional view, showing another example of a structure above the safety vent.

Further, as shown in FIG. 12, it is also possible to provide a resin sheet 40*a* having dimension large enough to cover the release opening 20*a* but smaller than the Thickness of the rechargeable battery 2. According to such configuration as well, the resin for forming the primary molding 11 is prevented from flowing into the release opening 20*a* to damage the function of the safety vent 20. When the safety vent 20 operates, the gas containing the electrolyte is ejected through the release opening 20*a*. The gas component passes through the adhesion interface between the resin sheet 40*a* and the sealing plate 23 as well as through the contact interface between the rechargeable battery 2 and each of the primary molding 11 and the secondary molding 12, and breaks the adhesion of the winding sheet 13 to be externally released. However, the liquid component such as the electrolyte can hardly pass through the interface so that much of the liquid component is held to stay inside, thereby the harmful effects due to leakage of the electrolyte is suppressed.

Figure 13A:
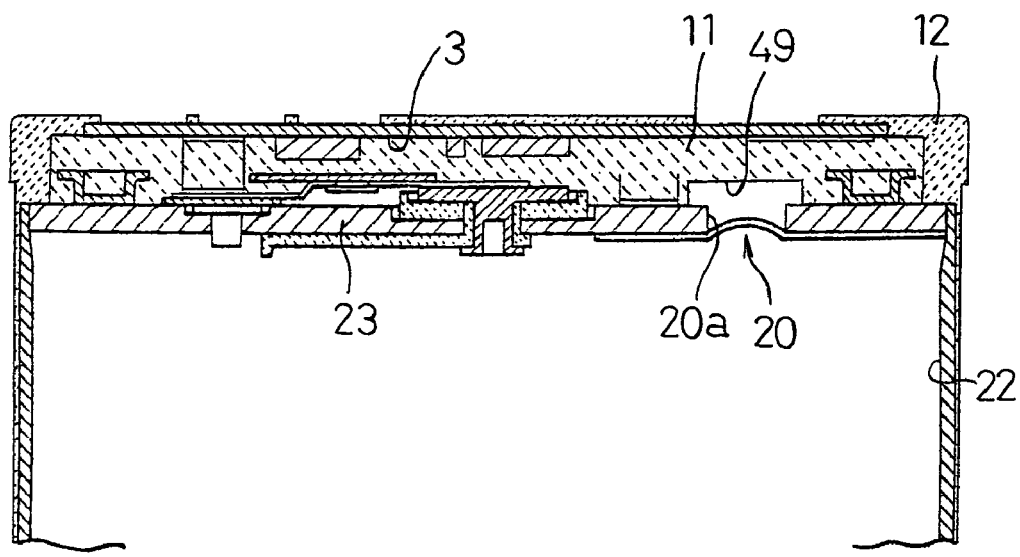
FIGS. 13A and 13B are cross-sectional views, showing a structure where an operating space is formed above the safety vent.
Figure 13B:
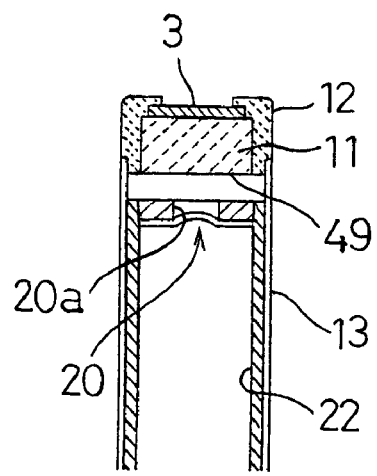

Furthermore, the operation of the safety vent 20 will not be interfered by forming an operating space 49 above the release opening 20*a* of the safety vent 20 while filling and molding the resin for forming the primary molding 11 and the secondary molding 12 as shown in FIGS. 13A and 13B. By forming a protrusion portion on the primary molding die 35 and the secondary molding die 46 to cover the release opening 20*a* formed on the sealing plate 23, the operation opening 49 having both side faces opening externally, as shown in FIG. 13B, is formed. As shown in FIG. 13B, externally opened side faces of the operating space 49 are covered with the winding sheet 13, and thus do not appear on the exterior of the battery pack 1. When the safety vent 20 operates, the ejected gas breaks the adhesion of the winding sheet 13 to be externally released.

Figure 14:
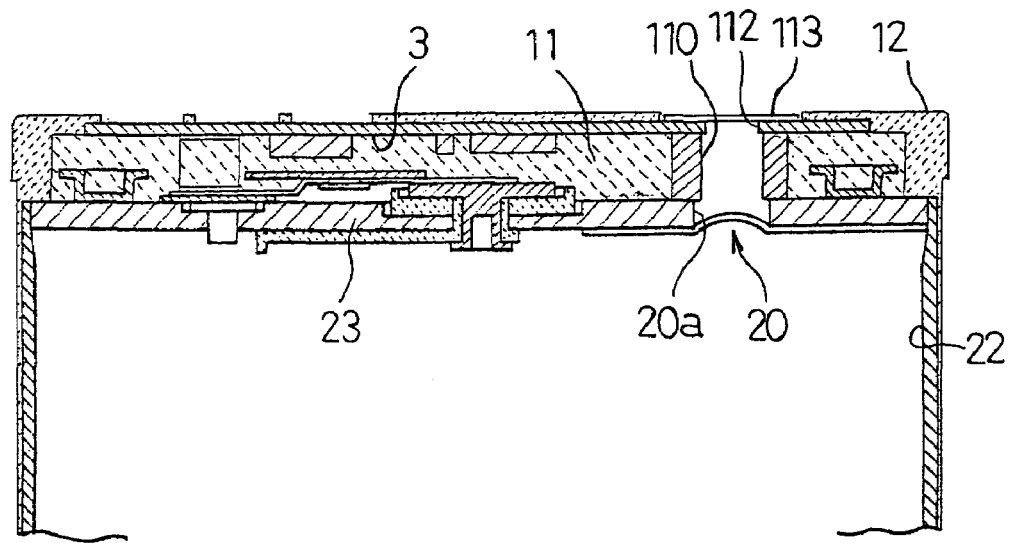
FIG. 14 is a cross-sectional view, showing a further example of a structure above the safety vent.

Furthermore, as shown in FIG. 14, another configuration may be constructed by: placing a cylindrical member 110 having a hollow portion as to coincide with the release opening 20a of the safety vent 20 in forming a primary mold body 11; forming an opening portion 112 on the circuit substrate 3; and covering the opening portion 112 of the circuit substrate 3 by affixing a sealing sheet 113 thereto. According to this configuration, when the safety vent 20 operates, a gas ejected from the release opening 20a passes through the cylindrical member 110 and the opening portion 112, and then breaks the adhesion of the sealing sheet 113 to be externally released.

Figure 15:
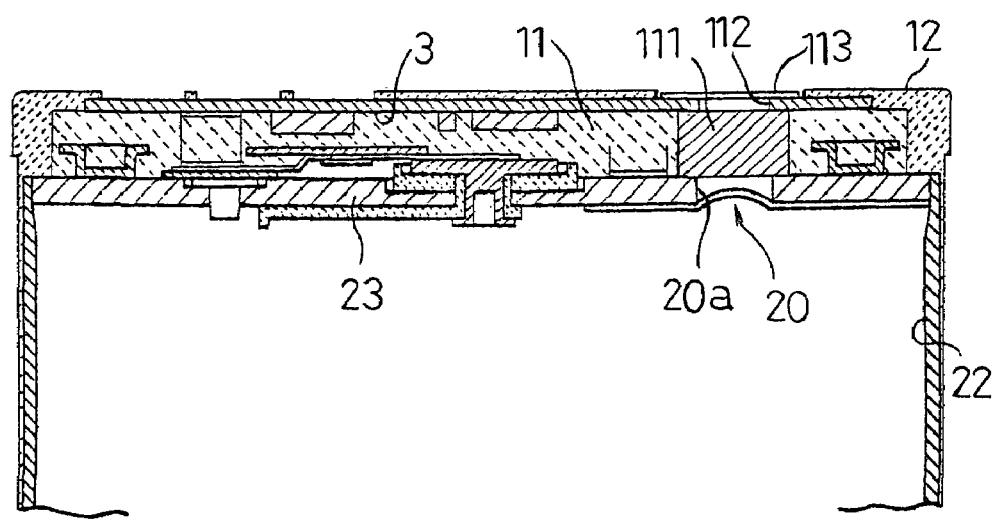
FIG. 15 is a cross-sectional view, showing a still further example of a structure above the safety vent.

Moreover, as shown in FIG. 15, still another configuration may be constructed by: placing a porous material 111 to cover the release opening 20a of the safety vent 20 in forming a primary mold body 11; forming an opening portion 112 on the circuit substrate 3 at a position corresponding to the porous material 111; and covering the opening portion 112 by affixing a sealing sheet 113 thereto. According to this configuration, when the safety vent 20 operates, a gas containing the electrolyte is ejected from the release opening 20a. However, only a gas component passes through the porous material 111 and breaks the adhesion of the sealing sheet 113 to be externally released from the opening portion 112, and much of a liquid component is held to stay inside the porous material 111 and suppressed from being externally exhausted, thereby leakage of the electrolyte is suppressed.

Figure 16:
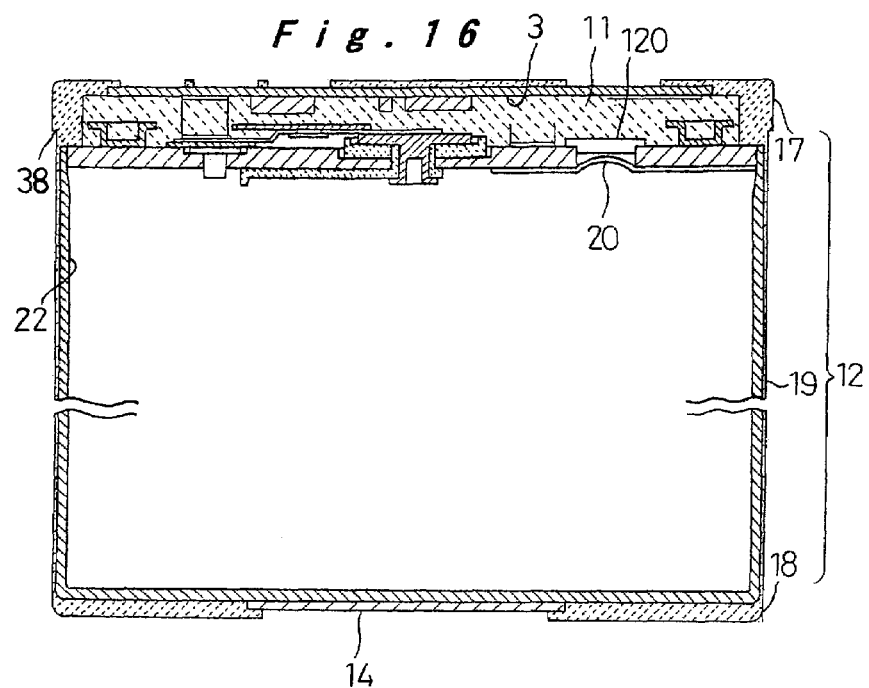
FIG. 16 is a cross-sectional view, showing a yet further example of a structure above the safety vent.
Figure 17A:
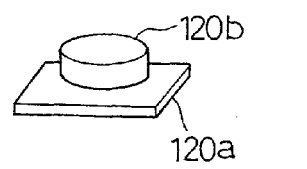
FIGS. 17A to 17G are perspective views, showing examples of sealing plugs made of rubber material.
Figure 17B:
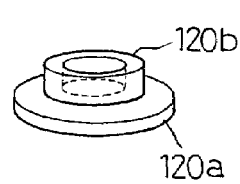
Figure 17C:
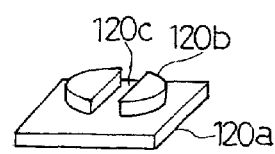
Figure 17D:
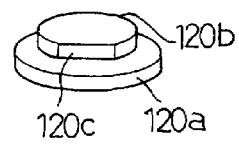
Figure 17E:
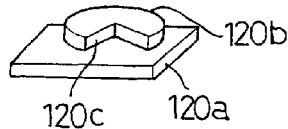
Figure 17F:
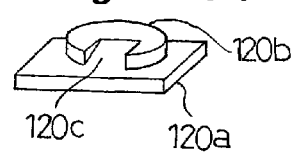
Figure 17G:
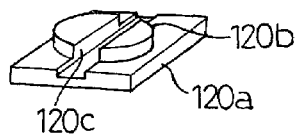

Further, it is possible to construct a battery pack by press-fitting a rubber-made sealing plug 120 into an upper part of the release opening 20a of the safety vent 20 in forming a primary molding 11 as shown in FIG. 16, and thereafter forming a secondary molding 12 as in a manner similar to the configuration as shown in FIG. 8. As shown in FIGS. 17A to 17G, a sealing plug 120 comprises a lid portion 120a and a stem portion 120b to cover the release opening 20a of the safety vent 20. The lid portion 120a is formed to be extended a projected area of the release opening 20a of the safety vent 20, so that the resin filled during the primary molding is prevented from intruding into the release opening 20a. On the other hand, the stem portion 120b, after it has been press-fit, securely holds the sealing plug 120 at the upper part of the release opening 20a until the end of the primary molding. Accordingly, the resin filled during the primary molding is prevented from intruding into the release opening 20a and covering the operating space of the safety vent 20, so that the function of the safety vent 20 is prevented from being damaged. When the safety vent 20 of the above-constructed battery pack operates due to increase in internal temperature and internal pressure caused by some factor, a gas component breaks the interface between the sealing plug 120 and the upper part of the release opening 20a, the interface between the primary molding 11 and the sealing plate 23, and further the adhesion surface of the winding sheet 13 (not illustrated) to be externally released. The stem portion 120b of the sealing plug 2 may be formed in various shapes such that having various types of cutout portions 120c as illustrated in FIGS. 17C to 17G. When such sealing plugs are applied, gap extending along the stem portion from its tip end to stem base is formed to be positioned between the upper part of the release opening 20a and the sealing plug 120 after the sealing plug 120 is press-fit into the upper part of the release opening 20a of the safety vent 20. Thereby, when the safety vent 20 operates, the release capability at the interface between the sealing plug 120 and the upper part of the release opening 20a is improved.

INDUSTRIAL APPLICABILITY

According to the present invention, as described above, the operation of the safety vent provided in the rechargeable battery is not interrupted, even though constructing a battery pack by integrating a rechargeable battery and a substrate by resin molding. Accordingly, it is suitable to provide a battery pack, having a rigidity to withstand the falling impact as a suitable power source for portable electronic equipment by resin molding, which will not result in explosion of the rechargeable battery when the battery pack is exposed under the high temperature condition.

The invention claimed is:

1. A battery pack comprising:
   a rechargeable battery including a battery case having an end aperture and accommodating elements for electromotive force;
   a metal sealing plate sealing the end aperture and having a sealing plate surface facing outward from the battery case;
   a safety vent formed by a release opening in the metal sealing plate for externally releasing internal abnormal pressure of the battery case;
   a substrate having external terminals and having a substrate surface disposed spaced from the sealing plate surface and positioned opposing the sealing plate surface;
   the sealing plate surface including circuit components mounted thereon; a resin molding filled and molded between and bonded via said molding to the sealing plate surface, the substrate surface and the components on the substrate surface; and
   the resin molding being molded with filled resin and and forming an operating space the safety vent.

2. The battery pack according to claim 1, wherein the safety vent is a clad vent structure which is formed by closing the release opening with a foil-like material at a side of the sealing plate facing an inner side of the battery case.

3. The battery pack according to claim 1, wherein the operating space opens to an outer surface of the resin molding.

4. The battery pack according in claim 1, wherein the substrate includes an opening portion connecting through to the operating space.

5. The battery pack according to claim 1, wherein a porous material is provided to inside of the operating space.

6. The battery pack according to claim 1, wherein the release opening of the safety vent of the sealing plate is covered by a sheet member prior to the resin filling and the resin molding bonds to the sheet member.

7. The battery pack according to claim 6, wherein the sheet member is formed with is side surfaces being exposed to outside the battery pack.

8. The battery pack according to claim 6, wherein the sheet member is made with a porous material.

9. The battery pack according to claim 3 or 7, further comprising a covering sheet covering externally opening portions of the operating space in a displaceable manner to permit venting.

10. The battery pack according to claim 1, further comprising a rubber-made sealing plug having a stem portion, and a lid portion being molded to extend a projected area of the release opening of the safety vent, wherein the stem portion is press-fit into the release opening.

11. The battery pack according to claim 10, wherein a gap, extending along the stem portion from a tip end of the stem portion to a stem base at the lid portion, is formed and positioned between the release opening of the safety vent and the sealing plug.

* * * * *